Figure 1:
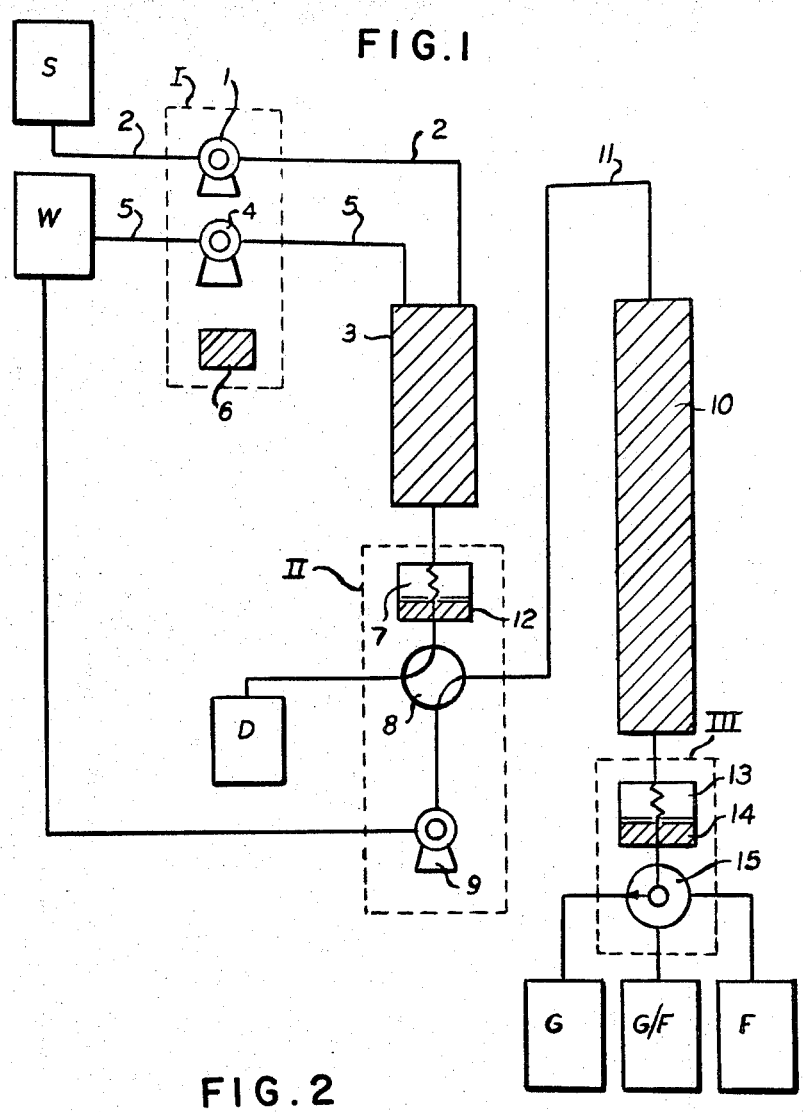

United States Patent [19]
Lauer et al.

[11] 3,785,864
[45] *Jan. 15, 1974

[54] PROCESS FOR THE CHROMATOGRAPHIC SEPARATION OF MULTI-COMPONENT MIXTURES CONTAINING GLUCOSE

[75] Inventors: Karl Lauer, Strahlenburg; Heinz-Günter Budka; Georg Stoeck, both of Mannheim-Waldhof, all of Germany

[73] Assignee: Boehringer Mannheim GmbH, Mannheim, Germany

[ * ] Notice: The portion of the term of this patent subsequent to Aug. 22, 1989, has been disclaimed.

[22] Filed: June 14, 1971

[21] Appl. No.: 152,980

Related U.S. Application Data

[63] Continuation-in-part of Ser. No. 75,465, Sept. 25, 1970, Pat. No. 3,686,117.

[30] Foreign Application Priority Data
July 23, 1970 Germany............................ 2036525
Mar. 13, 1971 Germany............................ 2112176

[52] U.S. Cl............. 127/46 A, 23/230 A, 23/253 A, 127/9
[51] Int. Cl.............................................. C13k 1/00
[58] Field of Search................ 127/9, 46 A; 210/24; 55/67; 23/230 A

[56] References Cited
UNITED STATES PATENTS
3,694,158    9/1972    Lauer............................... 23/230 A Primary Examiner—Morris O. Wolk
Assistant Examiner—Sidney Marantz
Attorney—Ralph D. Dinklage et al.

[57] ABSTRACT

Multi-component mixtures are chromatographically separated into their components on a large scale by using a separation column divided into two sections, passing the feed stream into the first section, removing the fractions containing impurities from the end of the first section, simultaneously passing an equivalent amount of elution agent into the second section, thereupon connecting the two column sections with each other until there appears at the end of the first section the fraction containing impurities from the next cycle of feed passed into the first section, and recovering the separated main components at the end of the second section.

15 Claims, 2 Drawing Figures

PROCESS FOR THE CHROMATOGRAPHIC SEPARATION OF MULTI-COMPONENT MIXTURES CONTAINING GLUCOSE

This application is a continuation-in-part of Ser. No. 75,465, filed Sept. 25, 1970, now U.S. Pat. No. 3,686,117.

The present invention is concerned with a process for the chromatographic separation of multi-component mixtures.

In recent years, column chromatography has been increasingly used on a large scale for the separation of mixtures of substances. Thus, for example, invert sugar can be chromatographically separated, the components glucose and frustose thereby being obtained in pure form.

Large-scale chromatographic processes are usually carried out cyclically, i.e., separation and elution phases alternate with one another continuously during operation of the process. In order to keep the economy of the process as high as possible, the attempt is made to carry out the separation of mixtures in columns which are as short as possible so that the individual cycles can follow one another as quickly as possible. However, it is often difficult to obtain a sufficient degree of separation under these conditions. Especially great difficulties arise when, in addition to the separation of the main components to be obtained, by-products are also to be separated which result in the cycles being so widely spaced apart that the economy of the separation process is rendered questionable.

In addition to the main components, glucose and fructose, epimerized and non-epimerized starch syrups contain, for example, considerable amounts of di-and polysaccharides. For the reasons mentioned above, it was heretofore not possible to obtain from these inexpensive starting materials the very valuable fructose and/or glucose components in pure form and in an economic manner by means of continuous cyclic column chromatography. Thus, for example, if the components of epimerized starch syrups were separated by means of cyclic column chromatography, then the relatively rapidly running contaminated fractions catch up with the already separated fructose fractions of the previous cycle when the cycles are not separated by a suitably long elution interval. However, such long elution intervals would reduce the capacity of the separation plant by more than half.

The present invention provides an apparatus which permits pure fractions to be obtained from multi-component mixtures on a large scale by means of cyclic column chromatography.

We have found that the time needed for one cycle can be considerably shortened and the above-mentioned disadvantages in prior art processes avoided when the separation column is divided into two sections, the contaminated fraction is removed from the column at the end of the first section, simultaneously an equivalent amount of elution agent is passed into the second section of the column and, after removal of the contaminated fraction, the two column sections are connected together until, at the end of the first column section, the contaminated fraction of the next cycle emerges.

In this manner, the complete length of the column can be utilized for the cyclic separation of multi-component mixtures. Furthermore, the contaminants have no further influence upon the length of the cycle, i.e., the separation of the multi-component mixture takes place just as economically and quickly as in the case of the separation of a mixture which contains only the components of interest.

The process according to the present invention has been investigated with epimerized and non-epimerized starch syrups and has provided to be of extraordinary technical advantage. For the separation of such syrups into their components, it is preferred to use an ion exchanger loaded with calcium ions.

It is clear, however, that the process can be used for all large-scale separation processes when the running time of the impurities differs sufficiently from that of the main components to be recovered.

In the case of the separation of said starch syrups, especially good separation results are obtained when the second column section has about twice the length of the first column section.

Generally three substances can be separated from each other with especially good results — provided that one of said substances has a substantially different migration velocity — when both column sections satisfy the following conditions:

1. Both sections taken together must have at least a length which provides sufficient separation of those fractions containing the components having a similar migration velocity.

2a. If the fraction containing the component to be removed after the first column section has a higher migration velocity than the other fractions (separation of starch syrup) the length of the first column section bears the relationship to the length of both column sections as the difference of the migration velocity of the two slowest fractions bears to the difference of the migration velocity of the two fastest fractions.

2b. If the fraction containing the component to be removed after the first column section has a lower migration velocity than the other fractions the length of the first column section bears the relationship to the length of both column sections as the difference of the migration velocity of the two fastest fractions bears to the difference of the migration velocity of the two slowest fractions.

Following the above-mentioned principle the fraction containing the component having the greatest difference of migration velocity relative to the compound of the middle fraction has to be removed from the end of the first section.

It is to be understood that additional fractors, such as column loading and inhomogeneities of the column, may necessitate the experimental optimization of the above values.

Figure 2:
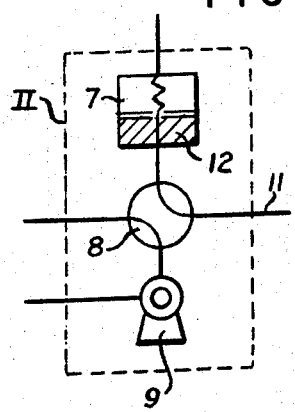

The process of the present invention will now be explained in more detail with reference to the accompanying drawings, in which:

FIG. 1 is a schematic representation of an apparatus for carrying out the process according to the present invention; and FIG. 2 is a detailed view of part of the apparatus illustrated in FIG. 1.

Referring now to FIG. 1 of the accompanying drawings, from a supply tank S, a solution of a multi-component mixture is pumped by pump 1 through a pipe 2 into a first column section 3. After a predetermined period of time, pump 1 is switched off and, simultaneously, from an elution agent reservoir W, elution agent is pumped by pump 4 through pipe 5 into the first column section 3, the supply capacity of the two pumps 1 and 4 being the same. After termination of the elution phase, pump 4 is switched off and pump 1 is again switched on. Pumps 1 and 4 are operated by a switch clock 6 after empirically determined and rigidly maintained time intervals.

The liquid leaving column section 3 passes through an analyzer 7 which, depending upon the concentration of the individual fractions, operates valve 8 via a control device 12. When the fraction which only contains impurities reaches the analyzer 7, valve 8 is switched in such a manner that liquid leaving the column reaction 3 is passed into container D; simultaneously, pump 9 is switched on, which pumps elution agent from elution agent container W into column section 10, the supply capacity of pump 9 corresponding exactly to those of pumps 1 and 4. Above a definite concentration in the liquid passing through the analyzer 7, i.e., when the impurities are removed and the concentration of the first main fraction has reached a definite value, valve 8 is switched in such a manner that the analyzer 7 is in direct connection with pipe 11 (see FIG. 2). In this position, pump 9 is switched off so that there is no connection between tank D and tank W.

By means of a logic element incorporates into the analyzer 7, this valve position remains unchanged until the concentration in the liquid flowing through the analyzer 7 increases from O to a low limiting value. This is the case when, after an intermediate flow of pure elution agent, impurities of the next cycle again appear in the analyzer 7.

By means of the process according to the present invention, only the main fractions, which are to be further separated, pass into the second and longer column section 10.

The further separation is carried out in the following manner;

An analyzer 13 operates valve 15, via a control device 14, in such a manner that the first fraction is collected in storage tank G and the second fraction in storage tank F. Intermediate fractions, which contain both components, are passed into tank G/F.

The separation plant contains three control units I, II and III which are encircled by broken lines in FIG. 1. Control unit I, containing the switch clock 6 and pumps 1 and 4 operates completely independently and, in the case of the operation of the separation plant, is empirically adjusted in such a manner that the fractions enter control unit III without interruption and with the smallest possible overlapping, one after the other.

Control unit II, containing the analyzer 7 and control device 12, as well as valve 8 and pump 9, serves for the removal of the fractions containing the impurities. The analyzer consists of a simple concentration measuring device, for example, a flow-through refractometer, the measurements results of which are passed to control device 12 as a proportional voltage. Control device 12 possesses a logic element which consists, for example, of a sequence relay and enables valve 8 and pump 9 to operate at a definite concentration only when, at the point of time of operation, the concentration in the liquid flowing through the analyzer 7 is on the increase. The control device also starts upon the operation of the water pump 9 during the take off of the fractions containing the impurities.

Control device III has already been described for the separation of fructose and glucose (see British Pat. Specification No. 1,095,210) and consists of an analyzer 13 with control device 14 and valve 15. It serves to conduct the main fractions into tanks G, G/F, and F. The analyzer 13 consists of measuring devices for the angle of rotation and for the refractive index. The measuring devices are equipped with flow-through cuvettes and provide the control device 14 with measured values in the form of proportional voltages. The control device 14 contains an analog calculator which calculates the partial concentrations of glucose and fructose in the manner described in British Pat. Specification No. 1,095,210, and, upon exceeding the permissible limiting concentrations, operates the valve 15 via a switch relay. For control of the separation process, a multi-color recorder can be attached to the analog calculator of the control device 14, this recorder recording the concentrations of glucose and fructose as a continuous elution diagram.

In FIG. 2, the control unit II is positioned in such a manner that the column section 3 is directly connected with the column section 10 via valve 8 and pipe 11.

The following example is given for the purpose of illustrating the present invention:

EXAMPLE 1

Large Scale Production of Pure Fructose from Epimerized Starch Syrup

Column measurements:
  column section 3 : diameter 10 cm., length 4.5 m.
  column section 10: diameter 10 cm., length 9.0 m.

At a rate of flow of 6 liters/hour, 2 liters of an approximately 15 percent by weight epimerized starch syrup solution were applied to column section 3. After 20 minutes, pump 1 was switched off and, via pump 4, water was pumped for 2.6 hours at a rate of flow of 6 liters/hour, from tank W into column section 3. Pumps 1 and 4 now alternately supply the column section 3 with a constant rhythm. After about 90 minutes, the analyzer 12 indicated the first changes in the refractive index and valve 8 was switched in such a manner that the eluate flowed off into tank D. The column section 10 was now supplied with water by pump 9. After a further 90 minutes, the impurities were removed from the column section 3. At a concentration of about 190 grams glucose/liter, valve 8, was switched over the column section 3 connected with column section 10. The eluate was now further separated in the column section 10 in the usual manner and fed into tanks G, G/F and F. The fructose solution obtained had a specific rotation of about −92° and satisfies the purity requirements of the Deutsches Arzneibuch No. 7, (German Pharmacological Standard Book No. 7).

EXAMPLE 2

Large Scale production of pure glucose from starch hydrolysates.

Column measurements:
  1. column section: diameter 1.20 m., length 5.00 m.

2. column section: diameter 1.20 m., length 10.00 m.

Column filled with Dowex 50 W X 4, loaded with calcium ions (polystyrene sulfonate resin cross-linked with divinylbenzene).

At a rate of 1,200 litres/hour a 50 percent by weight starch hydrolysate in a salt-free solution is applied to the column. After 60 minutes, the addition is interrupted and by means of another pump, water is pumped for 3 hours at a rate of 1,200 litres/hour into the column. At intervals of 4 hours the column is charged in this manner several hundred times continuously. 80–90 minutes after the addition of the starch, the analyser at the end of the first column section indicates the occurence of quickly migrating impurities (oligosaccharides) For approximately 30–40 minutes the eluate is taken off and collected in a corresponding tank, and is substituted by the same amount of water. After the occurrence of the first amounts of glucose in the analyser, column section 1 is connected with column section 2. Corresponding to the indication of a second analyser at the end of the second column section, the eluate is separated into the fractions containing oligosaccharides and glucose, respectively.

Following the evaporation of the eluates, there are obtained — on basis of the starch hydrolysate input — approximately 90 % glucose with a purity of 98–99 %, 8–10 % oligosaccharides obtained at the end of the first column section and 1–3 % oligosaccharides drawn off at the end of the second column section. The cyclic application of the starch hydrolysate allows a separation of 7,200 litres/day of starch hydrolysate, corresponding to a production of 3,500–4,000 kg glycose/day.

What is claimed is:

1. Process for the continuous separation of glucose from glucose syrup comprising glucose and, as impurities, oligosaccharides, by means of cyclic column chromatography, which process comprises
   A. passing, during a first period, the glucose syrup stream into the top of a first column of a set of two chromatographic separation columns comprising a first column and a second, separate column, connected therewith; and, during a second period, passing an elution agent into the top of said first column, and continuing such alternating supply of said first column with feed stream and elution agent, respectively, in the same constant rhythm;
   B. continuously monitoring the composition of the bottoms product of said first column, and passing the bottoms product of said first column into the top of said second column, and, when the amount of impurities therein rises to a predetermined level, diverting the bottoms product containing impurities from the end of the first column out of the system;
   C. while so diverting said bottoms products from said frist column, simultaneously passing an equal volume of an elution agent into the top of said second column and,
   D. recovering the separated glucose at the bottom of said second column.

2. Process as claimed in claim 1 wherein said glucose syrup consists essentially of starch hydrolysates.

3. Process as claimed in claim 1 wherein said glucose syrup comprises non-epimerized starch syrup.

4. Process as claimed in claim 1 wherein said second period is about three times as long as said first period.

5. Process as claimed in claim 1 wherein said second column is about twice as long as said first column.

6. Process as claimed in claim 1 wherein the glucose syrup and the elution agent are supplied by means of dosing pumps.

7. Process as claimed in claim 1 wherein the constitution of the glucose product obtained at the end of said second column is analyzed by measuring the angle of rotation and the refractive index of the glucose product leaving the said second column and using such measurements in an analog calculator to direct the separation of said product into glucose and the contaminants.

8. Process as claimed in claim 1 wherein the removal of the fractions containing oligosaccharide impurities from the end of the first column is effected when the take-off from said first column contains substantially only oligosaccharides.

9. Process as claimed in claim 1 wherein the elution agent is water.

10. Process as claimed in claim 1 wherein said glucose syrup is an epimerized starch syrup.

11. Process as claimed in claim 10 wherein the ratio of the length of said first section of the total length of both column sections is substantially the same as the ratio of (a) the difference of the migration velocity of the glucose and the fructose to be recovered at the end of the second section to (b) the difference of the migration velocity of the glucose and the migration velocity of the impurities.

12. Process as claimed in claim 1 wherein said columns contain an ion exchanger loaded with calcium ions.

13. Process as claimed in claim 12 wherein at least one of the columns is loaded with polystyrene sulfonate resin cross-linked with divinylbenzene as a chromatographic separating medium.

14. Process as claimed in claim 1 wherein the separation of the contaminated fractions at the end of said first section is carried out by means of a valve controlled by a concentration analyzer and a control device operatively connected therewith.

15. Process as claimed in claim 14 wherein said concentration analyzer comprises a refractometer with a flow-through cuvette which provides a proportional voltage.

* * * * *